US012710949B2

(12) United States Patent
Pena et al.

(10) Patent No.: US 12,710,949 B2
(45) Date of Patent: Aug. 18, 2026

(54) SYSTEMS AND METHODS FOR ENABLING CUSTOM DEVELOPMENT ON PROTECTED EMBEDDED DEVICE

(71) Applicant: Analog Devices International Unlimited Company, County Limerick (IE)

(72) Inventors: Eric Bobias Pena, Cavite (PH); Roldan Lagartera Marco, Metro Manila (PH); Aparna Anand Preethi, Bangalore (IN); Rajesh Vijayakumar, Bangalore (IN); Vinayak SunilKumar Priyadarsini, Bangalore (IN)

(73) Assignee: Analog Devices International Unlimited Company, Limerick (IE)

( * ) Notice: Subject to any disclaimer, the term of this patent is extended or adjusted under 35 U.S.C. 154(b) by 278 days.

(21) Appl. No.: 18/607,113

(22) Filed: Mar. 15, 2024

(65) Prior Publication Data

US 2025/0291570 A1 Sep. 18, 2025

(51) Int. Cl.
*G06F 8/61* (2018.01)
*G06F 8/41* (2018.01)
(Continued)

(52) U.S. Cl.
CPC ................ *G06F 8/63* (2013.01); *G06F 8/447* (2013.01); *G06F 8/65* (2013.01); *G06F 11/3692* (2013.01)

(58) Field of Classification Search
CPC .. G06F 8/60–66; G06F 8/447; G06F 11/3668; G06F 11/3672; G06F 11/3692; G06F 11/3696; G06F 11/3698
(Continued)

(56) References Cited

U.S. PATENT DOCUMENTS

| | | | |
|---|---|---|---|
| 6,230,119 B1 | 5/2001 | Mitchell | |
| 6,289,300 B1 | 9/2001 | Brannick et al. | |

(Continued)

FOREIGN PATENT DOCUMENTS

| | | | |
|---|---|---|---|
| CA | 2736300 A1 * | 10/2011 | G06F 8/65 |
| JP | H11119981 A * | 4/1999 | G06F 8/54 |
| WO | WO-2011159263 A1 * | 12/2011 | G06F 9/4403 |

OTHER PUBLICATIONS

Subramanian, Narayanan, et al., Testable embedded system firmware development: the out-in methodology, Computer Standards & Interfaces, 2000, 16 pages, [retrieved on Feb. 9, 2026], Retrieved from the Internet: <URL:https://www.sciencedirect.com/science/article/pii/S0920548900000544>.*

*Primary Examiner* — Geoffrey R St Leger
(74) *Attorney, Agent, or Firm* — Knobbe, Martens, Olson & Bear, LLP

(57) ABSTRACT

Systems and methods are disclosed for enabling custom development on protected embedded devices. An example method includes obtaining, from an evaluation device, a customer image with the customer image being pre-compiled and used a base image at linking time for symbol resolution and with internal memory including the base image within a first fixed memory range within the internal memory. Settings information included in the customer image is analyzed. The customer image is linked to the base image based on the settings information such that the customer image and base image function as an integrated image on the embedded device. The internal memory is updated to include the linked customer image and base image and the customer image encompasses a second fixed memory range within the internal memory. Results are output to the evaluation device.

20 Claims, 6 Drawing Sheets

(51) Int. Cl.
*G06F 8/65* (2018.01)
*G06F 11/3668* (2025.01)

(58) Field of Classification Search
USPC .................................................. 717/168–178
See application file for complete search history.

(56) References Cited

U.S. PATENT DOCUMENTS

| | | | | |
|---|---|---|---|---|
| 7,313,739 | B2 | 12/2007 | Menon et al. | |
| 7,568,141 | B2 | 7/2009 | Menon et al. | |
| 2008/0127058 | A1* | 5/2008 | Bray | G06F 8/34<br>717/106 |
| 2010/0180265 | A1* | 7/2010 | Tsai | G06F 8/54<br>717/140 |
| 2016/0350096 | A1* | 12/2016 | Pipilas | G06F 8/65 |

* cited by examiner

SYSTEMS AND METHODS FOR ENABLING CUSTOM DEVELOPMENT ON PROTECTED EMBEDDED DEVICE

BACKGROUND

Technical Field

The described technology generated relates to embedded systems, and more particularly to customizing embedded systems.

Description of the Related Art

Embedded systems are systems that include a combination of a processor, memory, input/output interfaces, and which may have a dedicated function. For example, an embedded system may include a digital watch, a music player, traffic light controller, and so on. With respect to a processor, an embedded system may include a microcontroller which has integrated memory and peripheral interfaces.

Embedded systems may have fixed memory and be designed to operate within that memory. For example, firmware (also referred to as an image) may be stored in flash memory or read-only memory. Since an embedded system does not need to generalize to arbitrary execution of applications or algorithms, the firmware may be substantially fixed. For example, specific memory addresses may be used in the firmware since usage of internal memory is known before deployment.

SUMMARY

The innovations described in the claims each have several aspects, no single one of which is solely responsible for its desirable attributes. Without limiting the scope of the claims, some prominent features of this disclosure will now be briefly described.

In one embodiment a method is described. The method is implemented by an embedded device, the embedded device including internal memory and one or more sensors. The method comprises obtaining, from an evaluation device, a customer image, wherein the customer image is pre-compiled and used a base image at linking time for symbol resolution, wherein the internal memory includes the base image within a first fixed memory range within the internal memory; analyzing settings information included in the customer image, the settings information identifying a number of applications which are to be executed on the embedded device and install information associated with the applications; linking the customer image with the base image, wherein the linked customer image and base image function as an integrated image on the embedded device, wherein the applications leverage protected functionality included in the base image, the functionality at least including raw data collection from the sensors, wherein the internal memory is updated to include the linked customer image and base image, and wherein the customer image encompasses a second fixed memory range within the internal memory; and outputting, to the evaluation device, results associated with execution of the applications.

In one embodiment an embedded device is disclosed. The embedded device comprises a microprocessor with integrated memory and peripheral interfaces in communication with one or more sensors, wherein the integrated memory includes a base image within a first fixed memory range, wherein the base image incudes functionality to at least perform raw data collection from the sensors, and wherein the microprocessor is configured to execute the base image. The microprocessor is configured to execute the base image to obtain, from an evaluation device, a customer image, wherein the customer image is pre-compiled and used the base image at linking time for symbol resolution; analyze settings information included in the customer image, the settings information identifying a number of applications which are to be executed on the embedded device and install information associated with the applications; link the customer image with the base image, wherein the linked customer image and base image function as an integrated image on the embedded device, wherein the applications leverage the functionality included in the base image, wherein the internal memory is updated to include the linked customer image and base image, and wherein the customer image encompasses a second fixed memory range within the internal memory; and output, to the evaluation device, results associated with execution of the applications.

In one embodiment non-transitory computer storage media is disclosed. The computer storage media is included in an embedded device and stores instructions. The instructions, when executed by a microprocessor included in the embedded device, cause the microprocessor to obtain, from an evaluation device, a customer image, wherein the customer image is pre-compiled and used a base image at linking time for symbol resolution, wherein the internal memory includes the base image within a first fixed memory range within the internal memory; analyze settings information included in the customer image, the settings information identifying a number of applications which are to be executed on the embedded device and install information associated with the applications; link the customer image with the base image, wherein the linked customer image and base image function as an integrated image on the embedded device, wherein the applications leverage functionality included in the base image, the functionality at least including raw data collection from the sensors, wherein the internal memory is updated to include the linked customer image and base image, and wherein the customer image encompasses a second fixed memory range within the internal memory; and output, to the evaluation device, results associated with execution of the applications.

BRIEF DESCRIPTION OF THE DRAWINGS

The following drawings and the associated description herein are provided to illustrate specific embodiments of the disclosure and are not intended to be limiting.

DETAILED DESCRIPTION

Figure 1A:
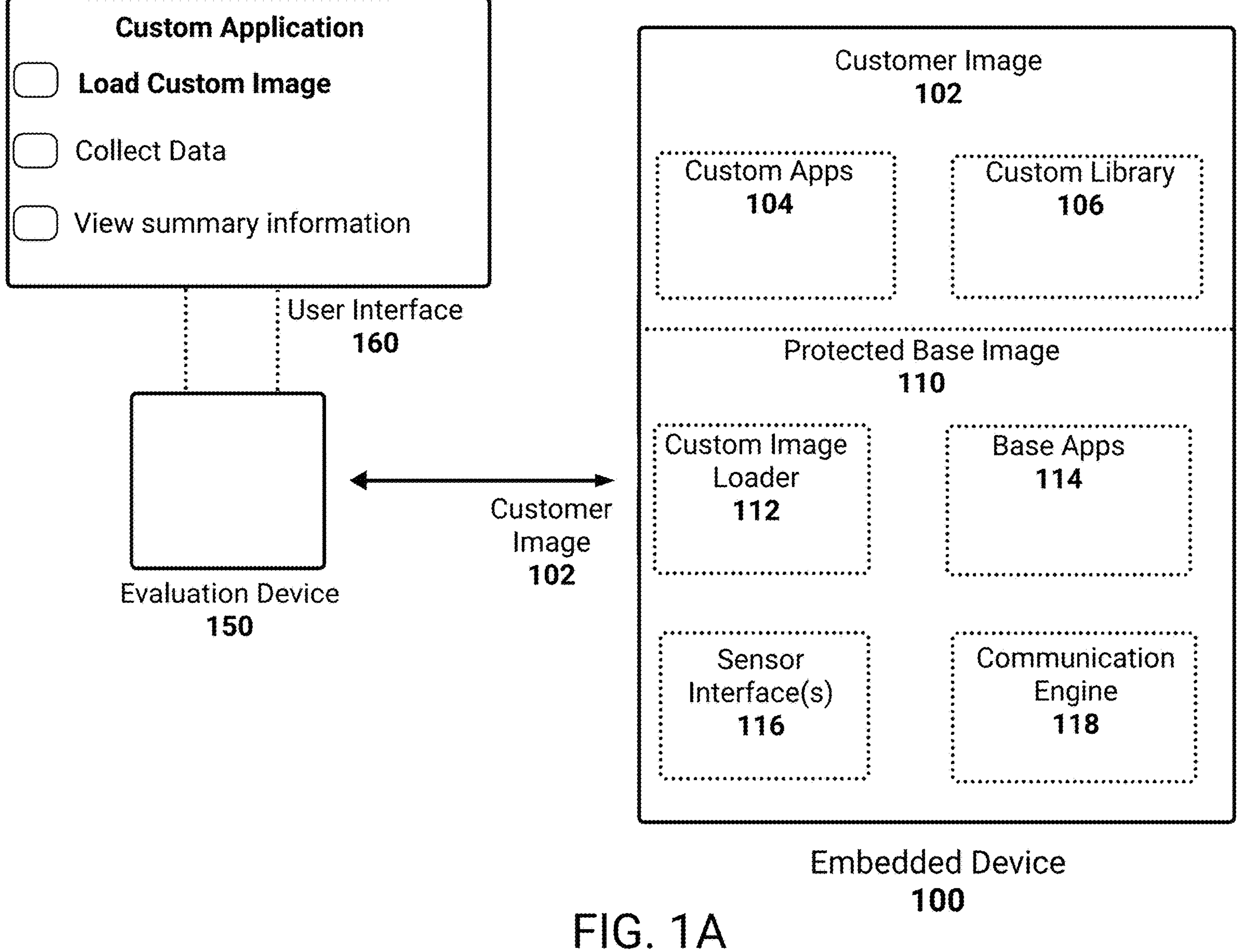
FIG. 1A is a block diagram of an example embedded device receiving a customer image to cause customized execution that leverages protected functionality of the embedded device.

This application describes techniques to evaluate an embedded device for custom usage through custom images (e.g., custom firmware) which leverage protected functionality of an existing, base, image on the embedded device. As may be appreciated, the base image may include intellectual property (IP) protected functionality. For example, and with respect to the embedded device being a medical smartwatch, IP protected functionality may include techniques (e.g., algorithms) to measure heart rate (e.g., photoplethysmography or 'PPG'). A developer (herein referred to as a customer) may wish to leverage this IP protected functionality through use of custom images (referred to herein as 'customer images'). As will be described, this application addresses current shortcomings with respect to use of embedded devices for customized execution. Thus, customers will have the opportunity to develop and embed their own applications which are run alongside IP protected base images of embedded devices. Additionally, the customer's own intellectual property will be protected.

Embedded systems or devices are increasingly common in, and form an integral part of, modern society. For example, embedded systems may be encountered as wearable devices (e.g., smart watches), drones, electric vehicle chargers, smart appliances (e.g., refrigerators, washing machines), automotive systems, and so on. These systems are commonly developed to use inexpensive, and largely inflexible, microcontrollers which may have fixed memory.

As known by those skilled in the art, such embedded devices require further support to cater to the continuously increasing requirement of processing qualifications. For example, customers may have a substantial burden associated with testing their applications or software on embedded systems. As an example, there is no current technique by which customers may execute their applications without requiring complex customization of each embedded system which is under consideration. The embedded devices may have their firmware protected via encryption and/or other IP restricting techniques, such that loading of a customize firmware is technically impractical. Since embedded devices are typically designed to be lower cost and run as a complete package, they lack the ability to execute arbitrary code. This leads to the long-standing problem pertaining to deployment of embedded systems in the field.

This application addresses the above-described technical problem related to use of embedded systems. As will be described, a customer may leverage protected base image functionality and easily load on their own customer image to perform custom functionality. For example, a customer may load a customer image onto a medical smartwatch to determine specific medical metrics. In this example, the customer may use functionality in the base image without having direct access to the underlying code and while not affecting the base image. For example, the base image may perform the raw data collection. The base image may also have functionality to perform certain analyses based on the raw data collection.

In this way, a customer may rapidly evaluate embedded devices for use. Additionally, the techniques described herein enable the customer to develop, fine-tune, embed their own applications/algorithms, deploy, and run the applications/algorithms seamlessly on top of an IP protected base application (e.g., base image).

As will be described, a customer may develop a customer image for deployment onto an embedded device. The customer image may represent code which has been compiled for use on the embedded device. In some embodiments, the customer image may represent a binary file. The code may advantageously leverage algorithms (e.g., functions) associated with a base image on the embedded device. For example, the base image may perform specific functionality and execute algorithms which are to be used by the customer image. As will be described, the base image may be used at linked time for symbol resolution.

The embedded device may include a custom image loader which receives the above-described customer image. As will be described, the custom image loader may link the customer image to the base image. In some embodiments, the linking may result in an integrated image which enables information to be passed between the base image and the customer image. The custom image loader may additionally allocate memory for any tasks which are associated with the customer image. A task, as described herein, may refer to any processing or output which is associated with an application included in the customer image. For example, an application may include an application to determine specific metrics using, at least in part, a combination of information determined by the base image. In this example, the task may include determining the specific metrics.

Advantageously, the base image may be unaffected by the custom image loader. For example, the base image may be resident in flash memory between known memory addresses. The customer image may be loaded into a separate portion of flash memory which is used specifically for the customer image. Thus, the custom image loader may link (e.g., integrate) these two images to enable the functionality described herein. The customer image may be modified, discarded, and so on, without affecting the base image or embedded device.

A user device, such as a laptop, computer, mobile device, and so on (collectively referred to herein as an evaluation device) may receive output (e.g., results) from the embedded device. The evaluation device may present the output in a user interface, such as an interactive user interface with which an end-user can interact. The end-user may tweak, or otherwise adjust, the customer image and cause rapid deployment back to the embedded device.

Block Diagrams

FIG. 1A is a block diagram of an example embedded device 100 receiving a customer image 102 to cause customized execution that leverages protected functionality of the embedded device. As described above, the protected functionality may be included in a base image 110 which is resident on the embedded device 100. For example, the base image 110 may represent firmware which is has been designed to operate the embedded device 100. As another example, the customer image 102 may represent firmware which a customer (e.g., developer or other use) is using to test the embedded device 100. For this example, the customer may be testing the embedded device for use in running their own applications on top of, or otherwise in conjunction with, the existing base image 110.

The embedded device 100 is illustrated as receiving a customer image 102 from an evaluation device 150. The evaluation device 150 may represent a laptop, computer, other embedded device, mobile device, back-end system or server, and so on. In some embodiments, the evaluation device 150 may compile code into a form which is suitable for storage on the embedded device 100. In some embodiments, the evaluation device 150 may provide the customer image 102 over a wireless connection (e.g., Bluetooth, Wi-Fi, and so on). The evaluation device 150 may also provide the customer image 102 over a wired connection (e.g., USB).

As described herein, the base image 110 may include functionality which is protected such that access to it is restricted. For example, the base image 110 may be compiled code that has intellectual property restrictions. Thus, access to this underlying code may be restricted by an entity associated with the embedded device 100. This can make testing of the embedded device 100 impractical, since the customer may lack the ability to write code that leverages the underlying code. For example, and as described above, embedded devices may typically have firmware which is developed specifically for an embedded device. Thus, it may be stored in flash or read-only memory and reference specific memory addresses associated with the memory. Embedded devices typically lack the ability to execute arbitrary code since they are designed for a specific purpose.

The base image 110, as illustrated in FIG. 1A, includes a custom image loader 112, base applications 114, sensor interfaces 116, and a communication engine 118. These elements 112-118 represent examples which may be included in the embedded device 100, and more or less elements may be used and fall within the scope of the disclosure herein.

The custom image loader 112 may enable the loading of the customer image 102 onto the embedded device 100. The customer image 102, as described above, may be a binary file reflecting code compiled on the evaluation device 150 or another device. During the compilation process, the base image 110 may be used at linking time for symbol resolution. In some embodiments, the linker may be configured to only resolve symbol addresses without adding it to the resulting customer image 102. Thus, the customer image 102 may be assured to have no redundancy of resources that are already available in the base image 110.

The embedded device 100 may have a memory space in which the base image 110 is loaded. In some embodiments, the base image 110 may be fixed in memory. In some embodiments, the base image 110 may be encompass a same portion of memory once the embedded device 100 is on. The custom image loader 112 may load the customer image 102 into internal memory of the embedded device 102. For example, the customer image 102 may be loaded into random access memory (RAM) or flash memory of the embedded device 100. As will be described, the custom image loader 112 may link the customer image 102 to the base image 110.

In some embodiments, the custom image loader 112 may use settings information to perform the linkage. The settings information may be included in header information or registry information associated with the customer image 102. The settings information may be present at a specific predefined address of memory. In this way, the loader 112 may easily identify the information.

As an example, the settings information may identify a number of applications included in the customer image 102. An application, as described herein, may represent discrete functionality which is to be implemented by the device 100. Thus, the developer may test multiple applications on the embedded device 100. The settings information may additionally include an availability flag indicating whether the customer image 102 is to be enabled.

The settings information may additionally include an entry function address. This address may represent an address at which an application will start. The address may also represent an address by which information is to be passed from the base image 110 to the customer image 102. For example, the base image may generate raw data, or data processed by protected functions, and transmit the data to the customer image for further analysis or processing. In some embodiments, the entry function address may indicate an address at which execution of an application included in the customer image 102 is to occur. For example, once the customer image 102 is integrated with the base image 110, the embedded device may reboot and execution may occur at the address. In some embodiments, the entry function address may represent an address at which the evaluation device 150 can send information (e.g., requests). For example, the evaluation device 150 may request output from the embedded device 100. In this example, the base image 110 may use the address to respond to requests from the evaluation device 150.

The custom image loader 112 may thus link one or more applications which are registered, or otherwise identified in, the settings information of the customer image 102 to the base image 110. Since the customer image 102 was compiled, and linked, based on the base image 110, the customer image 102 may thus communicate with the base image 110. In some embodiments, the custom image loader 112 may update Flash memory of the embedded device 100 to include the linked customer image 102 and base image 110. For example, the custom image loader 112 may perform, or cause performance of, a device firmware upgrade (DFU). In this example, the DFU will result in a single image which has both the customer image 102 and base image 110 logically included.

In some embodiments, the evaluation device 150 may output an image which represents a merging of the customer image 102 and base image 110. This merged or integrated image may then be stored in flash of the embedded device 100 for example via DFU. The custom image loader 112 may then analyze the image as described above, for example to install the applications.

The custom image loader 112 may additionally allocate memory for the tasks associated with the customer image 102. For example, each application included in the customer image 102 may be associated with at least one processing, or output, task. Thus, the custom image loader 112 may assign portions of memory (e.g., RAM) to each of the tasks. In some embodiments, the custom image loader 112 may validate the customer image 102. For example, the loader 112 may calculate a checksum with the expected value being included in the settings information.

The base image 110 further includes base applications 114. The base applications 114 may represent applications or algorithms which are protected and which would otherwise be inaccessible to the developer. As an example, and with respect to the embedded device being a smart watch, the base applications 114 may include functionality to obtain sensor measurements reflective of heart rate. For this example, the sensor measurements may represent optical measurements which are obtained using pulse oximetry. The base applications 114 may include functionality to determine heart rate based on these optical measurements. Thus, the base applications 114 may include functionality for raw sensor collection and, optionally, IP-protected algorithms. In this way, the developer may have access to the raw data along with processed versions of the raw data.

The base image 110 further includes sensor interfaces 116. The embedded device 100 may include one or more sensors which are in communication with the base image 110. An example sensor may include a photodetector which receives light passed through a portion of a person's body. Another example sensor may include a camera, a laser, a temperature sensor, and so on. The base image 110 may further include a communication engine 118. For example, the communication engine 118 may enable wireless communications and/or wired communications as described herein.

The customer image 102 may include the above-described custom applications 104. Each application may perform arbitrary processing using, at least in part, the base applications 114 included in the base image 110. Additionally, the custom applications 104 may leverage a custom library 106. For example, the custom library 106 may include functions which may be commonly used by all, or a subset, of the custom applications. In some embodiments, the custom library 106 may be written by the developer. The custom library 106 may also represent publicly available functions.

Figure 1B:
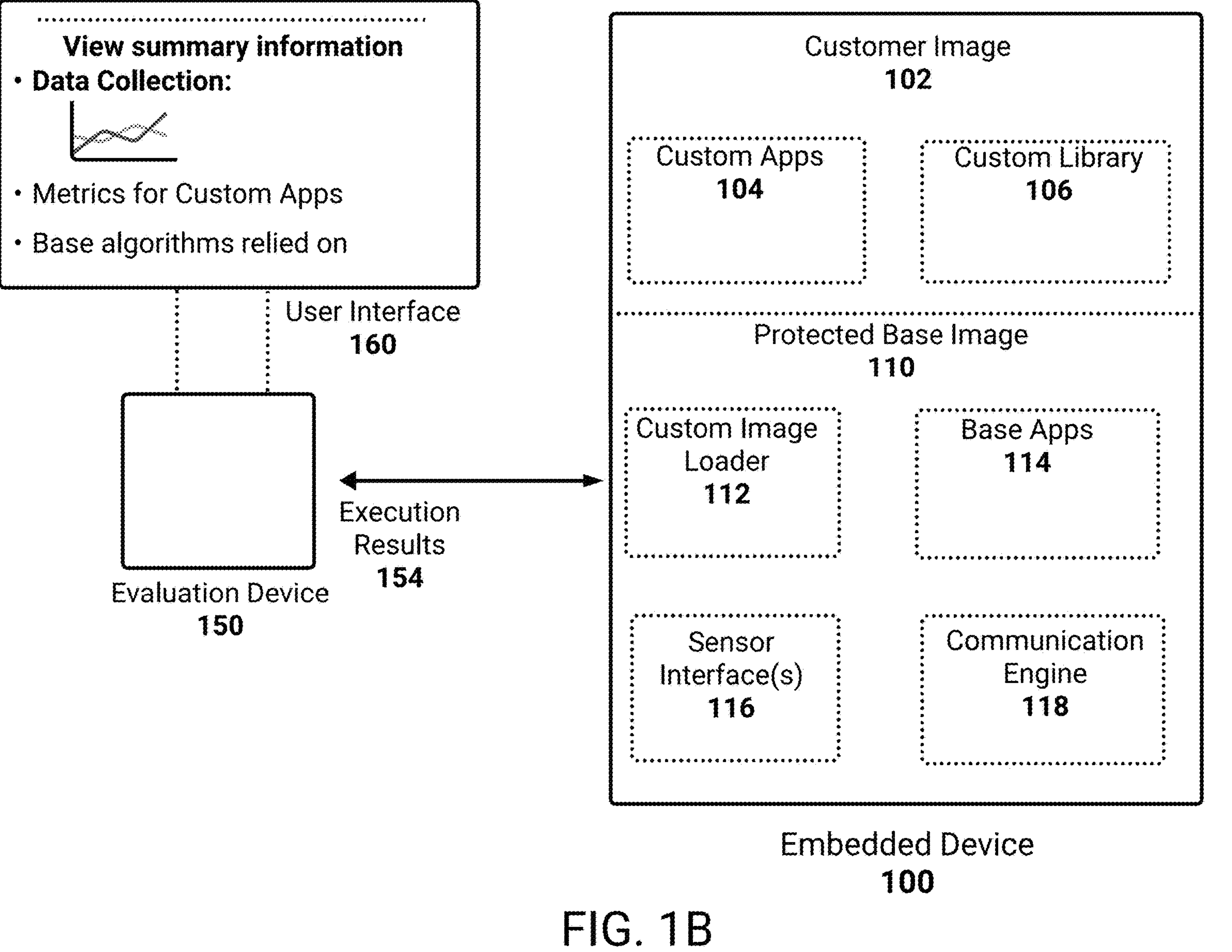
FIG. 1B is a block diagram of the example embedded device outputting execution results for presentation via a user interface.

In the illustrated example, the evaluation device 150 is presenting user interface 160. The user interface 160 may represent an interactive user interface with which an end-user (e.g., the developer) can interact. For example, the user interface 160 may allow the evaluation device 150 to load a customer image (e.g., customer image 102) onto the embedded device 100. The user interface 160 may additionally allow the evaluation device 150 to discard customer image 102. In this way, the embedded device 100 may return to its normal functionality based on the base image 110. The user interface 160 may additionally cause collection of data from the embedded device 100. For example, in response to selection of the option to 'Collect Data,' the evaluation 150 device may provide a request to the embedded device 100 for results. Output may then be provided, for example via one or more of the custom applications 104. The user interface 160 may additionally enable summary information to be viewed. FIG. 1B illustrates an example of summary information being presented in the user interface 160.

FIG. 1B is a block diagram of the example embedded device 100 outputting execution results for presentation via a user interface 160. In the illustrated example, the end-user of the user interface 160 has selected an option to view summary information associated with the custom applications 104. The evaluation device 150 has received execution results 154 from the embedded device 100, and is presenting summary information based on the results 154. The evaluation device 150 receive the results 154 from the customer image 102, for example based on the settings information described in FIG. 1A.

The user interface 160 is presenting example summary information including information regarding data collection, metrics for the custom applications 104, and base algorithms (e.g., base applications 114) relied upon. As may be appreciated, other summary information may be used and fall within the scope of the disclosure herein. As described above, the base image 110 may be relied upon for data collection tasks which leverage sensor information. The customer image 102 may be used to perform added processing, analyses, and so on, which leverage the data collection. Thus, the user interface 160 may present graphics, analyses, raw data, and so on, which is associated with the data collection.

The metrics may include custom metrics defined by a developer who is using the embedded device 100 for testing. In some embodiments, the metrics may be selected from a template of metrics associated with use of an embedded device. The base algorithms relied on may include metrics associated with use of functionality in the base image 110. These metrics may be identified based on the code included in the customer image 102, such as a metric associated with a number of times base image 110 functionality is used. The metrics may also be determined based on actual execution. For example, the customer image 102 may include code to monitor execution time, resources used, and so on, of specific algorithms or functionality in the base image 110.

Figure 2A:
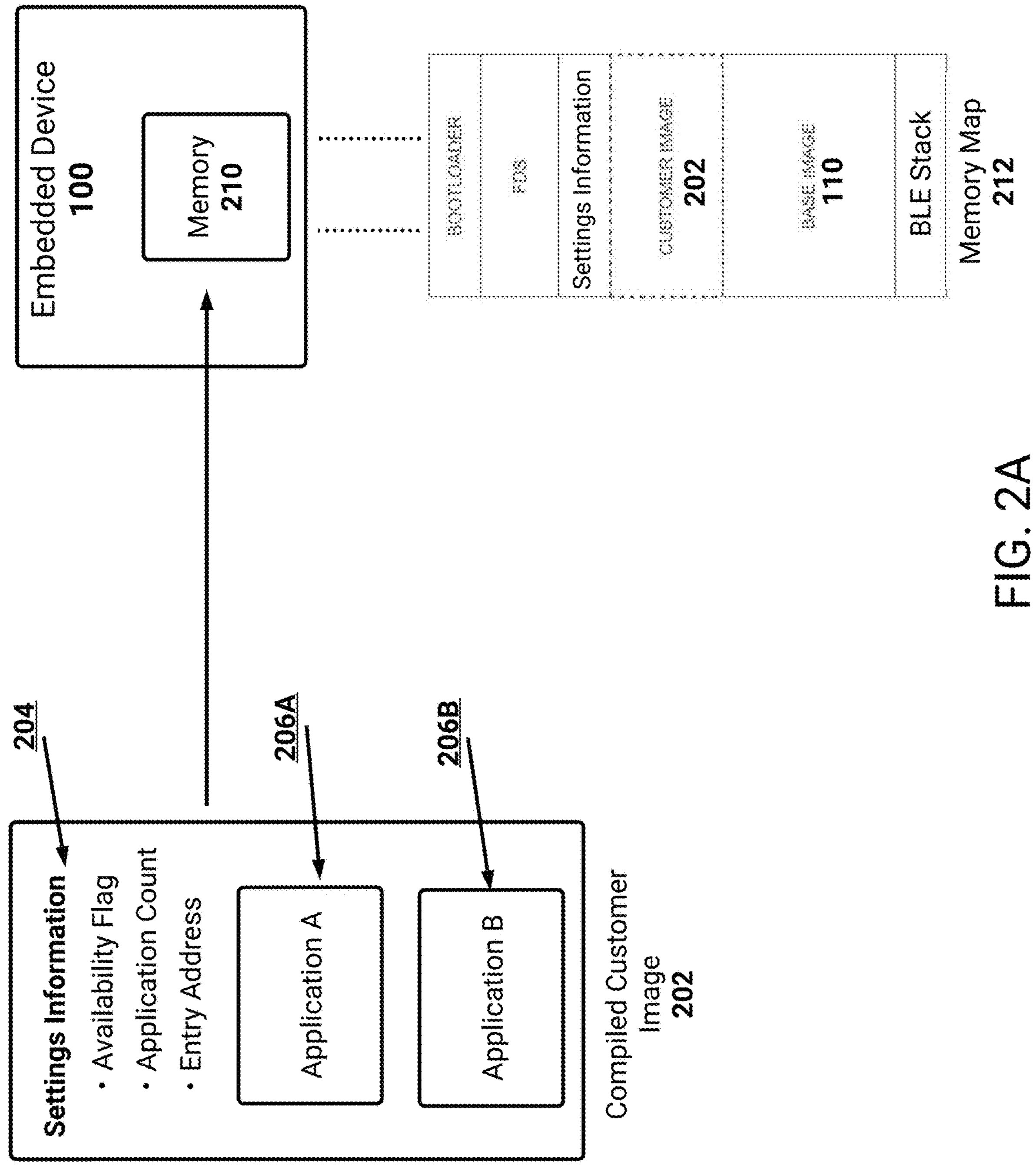
FIG. 2A is a block diagram of an example embedded device updating internal memory based on a received customer image.

FIG. 2A is a block diagram of an example embedded device 100 updating internal memory 210 based on a received customer image 202. As described in FIG. 1A, the customer image 202 may be compiled, and subsequently linked, based on the base image 110 (e.g., an executable linkable format file). Thus, the customer image 202 may leverage functions in the base image such as functions for data collection, analyses, and so on.

The embedded device 100 may receive the customer image 202 via a wired or wireless connection. As described herein, the base image 110 may include functionality to cause integration of the customer image 202 with the received customer image 202. Once integrated, the embedded device 100 can use the customer 202 and base image 110 as a single image.

In some embodiments, the embedded device 100 may maintain the base image 110 in a consistent portion of memory 210. The memory 210 may additionally have a portion which may be used by the customer image 202. For example, the customer image 202 may have its own portion in a memory layout of the memory 210. In this way, the embedded device 100 may update the memory 210 to include the customer image 202. Similarly, the embedded device 100 may remove the customer image 202 without affecting operation of the base image 110. That is, the customer image 202 may leverage functionality of the base image 110 but is not required for operation of the embedded device 110. Through controlling the memory map of the memory 210 the loading, modification, and unloading, of the customer image 202 can be rapidly effectuated without affecting the base image 110.

As described in FIG. 1A, the customer image 202 may include settings information 204. This information 204 may be included as a header, metadata, registry information, and so on. With respect to the example of FIG. 2A, the customer image includes two applications (e.g., application A-B 206A-206B). The settings information 204 reflects this number of applications (e.g., in the application count portion) such that the embedded device 100 may identify which applications are to be executed. The settings information 204 further indicates an entry address, which as described may indicate an address which is responsive to requests from an evaluation device.

An example memory map 212 of the memory 210 is included in FIG. 2A. As illustrated, the base image 110 is included in a portion with the customer image 202 being included in a separate portion. Other portions of the memory include wireless functionality (e.g., the Bluetooth low energy 'BLE' stack), a bootloader, settings information, and flash data storage (FDS). In some embodiments, the customer image 202 may utilize a portion of the memory map 212 which is dedicated for customer images. Thus, depending on the size of the customer 202 it may not fill the entire portion.

The memory map 212 may relate to the memory 210 being flash memory. Thus, the customer image 202 and base image 110 may represent an integrated image which is being used by a developer. While not illustrated, RAM of the embedded device 100 may include portions for the base image 110 and the customer 202. For example, the embedded device 100 may allocate RAM for applications 206A-206B of the customer image 202.

Figure 2B:
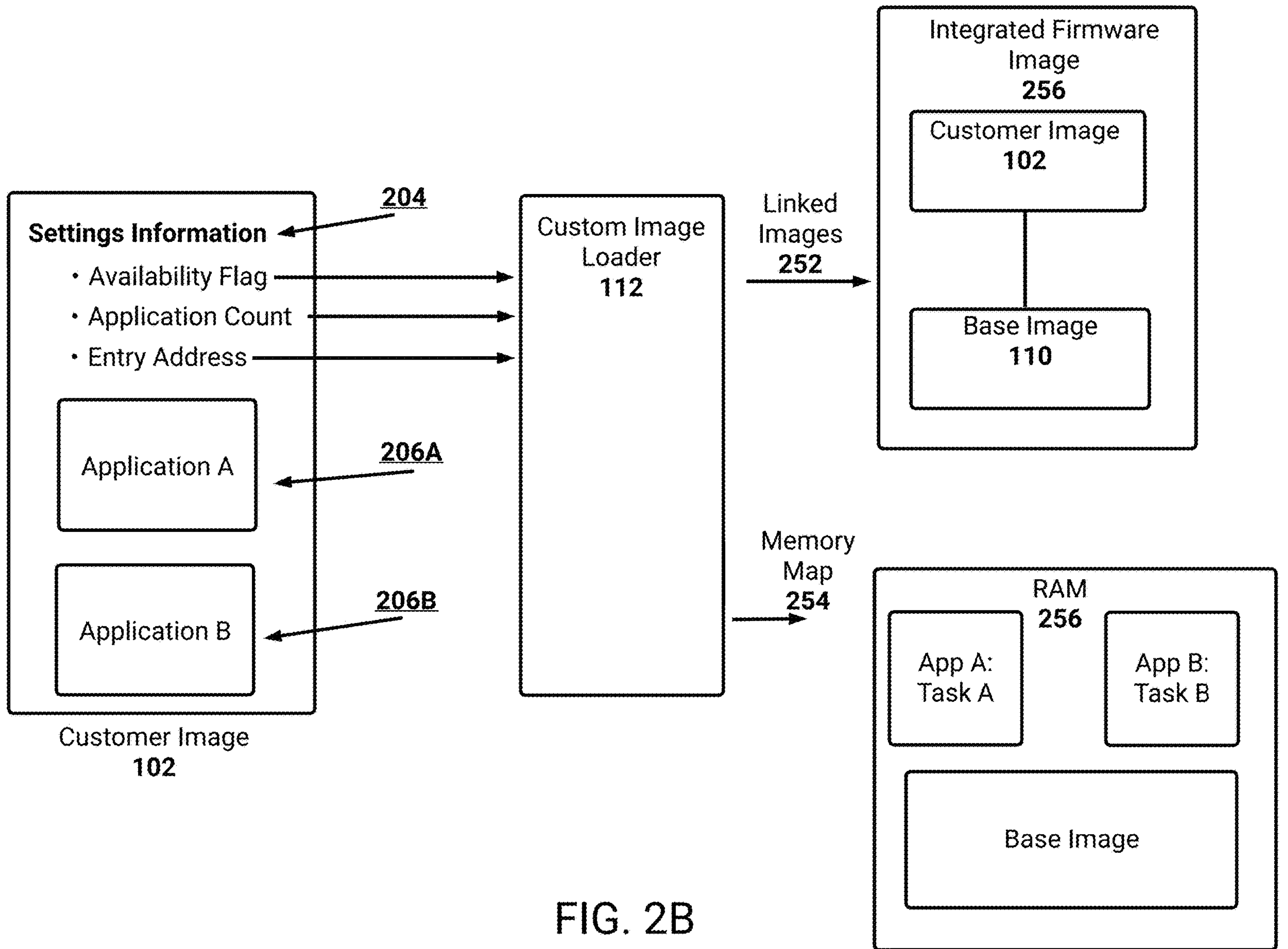
FIG. 2B is a block diagram of a custom image loader executing on the embedded device integrating the customer image with a base image.

FIG. 2B is a block diagram of a custom image loader 112 integrating the customer image 102 with the base image 110. The custom image loader 112, as described in FIG. 1A, may execute on the embedded device as part of the base image 110.

The custom image loader 112 may receive the customer image 102 and analyze the settings information 204 to ascertain the applications 206A-206B which are to be utilized. For example, the custom image loader 112 may install the applications 206A-206B on the embedded device. The custom image loader 112 may integrate or otherwise link the customer image 102 with the base image 110. As described above, the applications 206A-206B may utilize functionality of the base image 110 such as via calling functions in the base image 110. Thus, the custom image loader 112 may enable the link between the customer image 102 and base image 110. For example, the custom image loader 112 may allow the base image 110 to output information to, and respond to requests from, the customer image 102.

As described above, the custom image loader 112 may update internal memory of the embedded device to include an integrated firmware image 256. In some embodiments, this updating may be accomplished via a device firmware upgrade (DFU). For example, the custom image loader 112 may cause the embedded device to reboot. In this example, upon reboot the applications 206A-206B will be registered in settings or registry information associated with the embedded device. Thus, the embedded device will load one, or all, of the applications 206A-206B which have now been registered with the device.

The custom image loader 112 will additionally update a memory map 254 associated with RAM 256. For example, the RAM will be updated to include portions reserved for the base image and each of the applications 206A-206B.

Flowcharts

Figure 3:
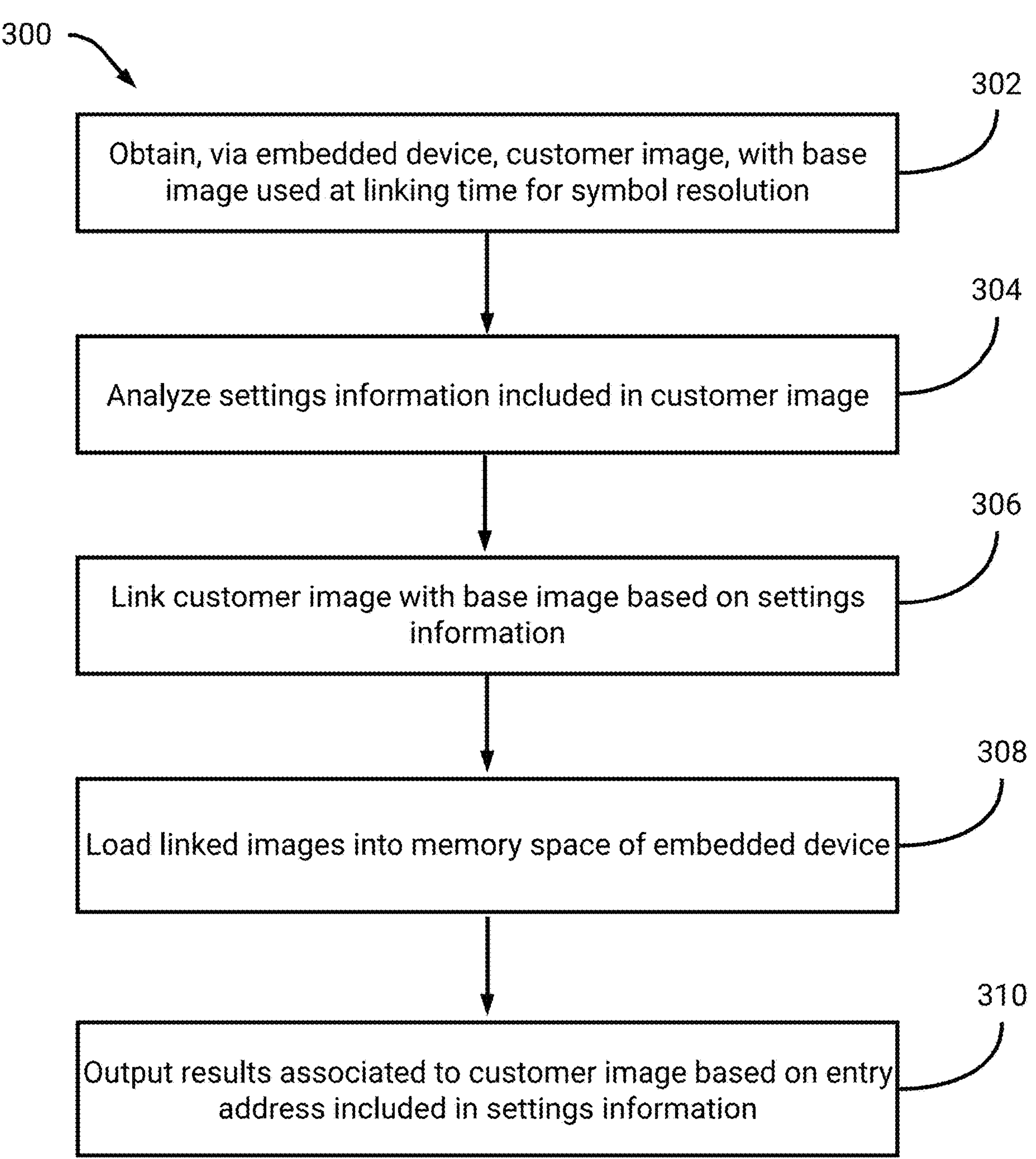
FIG. 3 is a flowchart of an example process for an embedded device to execute a received customer image that leverages protected functionality of a base image.

FIG. 3 is a flowchart of an example process 300 for an embedded device to execute a received customer image that leverages protected functionality of a base image. For convenience, the process 300 will be described as being performed by an embedded device (e.g., embedded device 100 with a microcontroller or microprocessor). The process 300 may also be performed by a custom image loader executing on the embedded device (e.g., custom image loader 112).

At block 302, the embedded device obtains a customer image. The embedded device is in communication, such as wired or wireless communication, with an evaluation device (e.g., a laptop, tablet, computer, mobile device, and so on. Thus, the embedded device receives the customer image from the evaluation device. As described herein, the customer image may be linked with a base image for symbol resolution (e.g., a linker associated with a compiler, such as GCC, may use an ELF file associated with the base image).

At block 304, the embedded device analyzes setting information included in the customer image 304. The embedded device obtains settings information, such as included in a header or registry associated with the customer image. The customer image includes one or more applications which are to execute on the embedded device and which are to use data collected by the base image. For example, the base image may cause activation of, and further control of, sensors associated with the embedded device. The applications may leverage data associated with these sensors.

As described above, the embedded device may identify a number of applications which are to execute along with addresses associated with the applications. For example, the addresses may indicate addresses at which the applications begin and end in memory. As another example, the addresses may indicate addresses at which the applications provide requests to the base image. As another example, the addresses may indicate addresses at which the applications are responsive to requests from the evaluation device.

At block 306, the embedded device links the customer image with the base image. The embedded device may install the applications based on the header or registry information. These applications may then be linked to the base image, such that base image function calls made via the customer image utilize the base image. Additionally, the base image may be instructed to respond to requests from the applications.

At block 308, the embedded device loads the linked images into memory of the embedded device. In some embodiments, the embedded device may update its internal memory (e.g., flash memory) to include the linked images. Thus, the customer image and base image may be stored in flash memory. Additionally, the embedded device allocates memory for tasks associated with execution of the applications.

At block 310, the embedded device outputs results associated with the customer image. The embedded device may execute, such that the applications are run. Results associated with their execution may be output to the evaluation device. For example, the settings information in the customer image may include one or more addresses which are used to respond to requests, or to push information via, the evaluation device.

Figure 4:
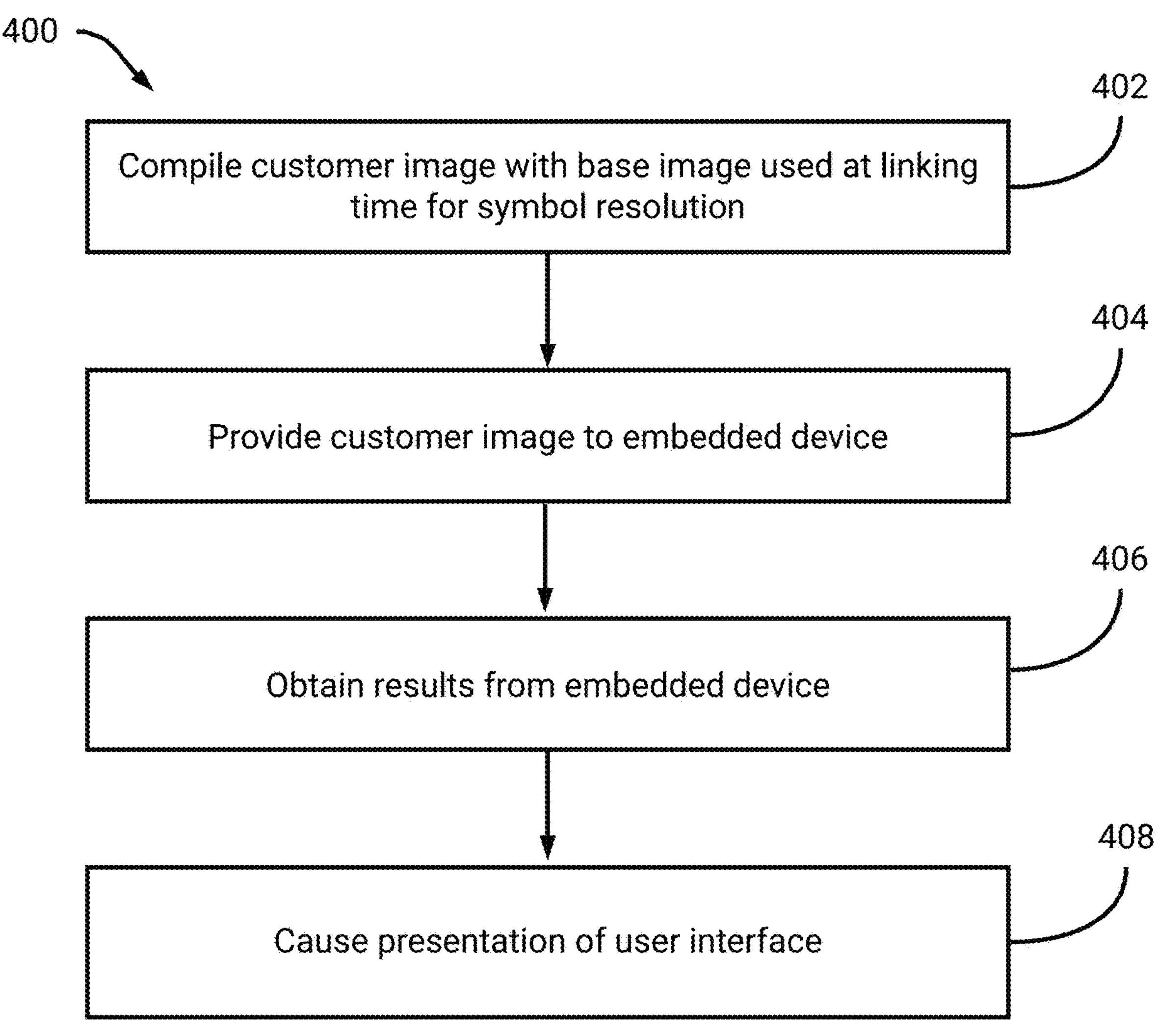
FIG. 4 is a flowchart of an example process for an evaluation device to obtain results associated with execution of a customer image on an embedded device.

FIG. 4 is a flowchart of an example process 400 for an evaluation device to obtain results associated with execution of a customer image on an embedded device. For convenience, the process 400 will be described as being performed by a system of one or more processors (e.g., the evaluation device 150).

At block 402, the system compiles a customer image with a base image used at linking time for symbol resolution. As described above, the customer image may utilize functions included in the base image. Additionally, the customer image may include one or more applications which are to execute on the embedded device.

At block 404, the system provides the customer image to an embedded device. The system outputs the customer image to the embedded device via a wireless or wired connection. The embedded device may already have the base image on it, such that the embedded device may run normally with the base image. The customer image is used to adjust functionality of the embedded device by leveraging the existing functionality of the base image. As described above, in some embodiments the system may output an integrated image which includes the customer and base image. This integrated image may be stored in flash of the embedded device, and the embedded device may install the applications (e.g., via a custom image loader).

At block 406, the system obtains results from the embedded device. Output from the customer image is received via the system, for example via a wired or wireless connection.

At block 408, the system presents a user interface. As described in FIGS. 1A-1B, the system may present summary information associated with execution of the customer image.

OTHER EMBODIMENTS

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and engines described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A method implemented by an embedded device, the embedded device including internal memory and one or more sensors, the method comprising:

obtaining, from an evaluation device, a customer image, wherein the customer image is pre-compiled and linked against a base image for symbol resolution, wherein the internal memory includes the base image within a first fixed memory range within the internal memory;

analyzing settings information included in the customer image, the settings information identifying a number of applications which are to be executed on the embedded device and install information associated with the applications;

linking the customer image with the base image, wherein the linked customer image and base image function as an integrated image on the embedded device, wherein the applications leverage protected functionality included in the base image, the functionality at least including raw data collection from the sensors, wherein the internal memory is updated to include the linked customer image and base image, and wherein the customer image encompasses a second fixed memory range within the internal memory; and outputting, to the evaluation device, results associated with execution of the applications.

2. The method of claim 1, wherein the base image includes functionality for raw data collection and further includes one or more functions associated with analysis.

3. The method of claim 1, wherein updating the internal memory is performed via a device firmware upgrade (DFU).

4. The method of claim 3, wherein the embedded device reboots after the DFU, and wherein execution initiates from at least one of the applications.

5. The method of claim 4, wherein execution initiates from an address identified in the install information.

6. The method of claim 1, wherein the base image includes a custom image loader, wherein the custom image loader obtains the customer image and causes updating of the internal memory to include the linked customer image and base image.

7. The method of claim 1, wherein the method further comprises:

allocating memory for respective tasks associated with execution of the applications, wherein the allocated memory corresponds to portions of random access memory (RAM) included in the embedded device.

8. The method of claim 1, wherein the first fixed memory range and the second fixed memory range are separate in the internal memory, and wherein the customer image is configured to be updated or removed without affecting the first fixed memory range.

9. An embedded device comprising:

a microprocessor with integrated memory and peripheral interfaces in communication with one or more sensors, wherein the integrated memory includes a base image within a first fixed memory range, wherein the base image incudes functionality to at least perform raw data collection from the sensors, and wherein the microprocessor is configured to execute the base image to:

obtain, from an evaluation device, a customer image, wherein the customer image is pre-compiled and linked against the base image for symbol resolution;

analyze settings information included in the customer image, the settings information identifying a number of applications which are to be executed on the embedded device and install information associated with the applications;

link the customer image with the base image, wherein the linked customer image and base image function as an integrated image on the embedded device, wherein the applications leverage the functionality included in the base image, wherein the internal memory is updated to include the linked customer image and base image, and wherein the customer image encompasses a second fixed memory range within the internal memory; and output, to the evaluation device, results associated with execution of the applications.

10. The embedded device of claim 9, wherein the base image includes functionality for raw data collection and further includes one or more functions associated with analysis.

11. The embedded device of claim 9, wherein updating the internal memory is performed via a device firmware upgrade (DFU).

12. The embedded device of claim 11, wherein the embedded device reboots after the DFU, and wherein execution initiates from at least one of the applications.

13. The embedded device of claim 12, wherein execution initiates from an address identified in the install information.

14. The embedded device of claim 9, wherein the base image includes a custom image loader, wherein the custom image loader obtains the customer image and causes updating of the internal memory to include the linked customer image and base image.

15. The embedded device of claim 9, wherein the microprocessor is further configured to:

allocate memory for respective tasks associated with execution of the applications, wherein the allocated memory corresponds to portions of random access memory (RAM) included in the embedded device.

16. Non-transitory computer storage media included in an embedded device, the computer storage media storing instructions that when executed by a microprocessor included in the embedded device, cause the microprocessor to:

obtain, from an evaluation device, a customer image, wherein the customer image is pre-compiled and linked against a base image for symbol resolution, wherein an internal memory includes the base image within a first fixed memory range within the internal memory;

analyze settings information included in the customer image, the settings information identifying a number of applications which are to be executed on the embedded device and install information associated with the applications;

link the customer image with the base image, wherein the linked customer image and base image function as an integrated image on the embedded device, wherein the applications leverage functionality included in the base image, the functionality at least including raw data collection from sensors, wherein the internal memory is updated to include the linked customer image and base image, and wherein the customer image encompasses a second fixed memory range within the internal memory; and output, to the evaluation device, results associated with execution of the applications.

17. The computer storage media of claim 16, wherein the base image includes functionality for raw data collection and further includes one or more functions associated with analysis.

18. The computer storage media of claim 16, wherein updating the internal memory is performed via a device firmware upgrade (DFU), wherein the embedded device reboots after the DFU, and wherein execution initiates from at least one of the applications, and wherein execution initiates from an address identified in the install information.

19. The computer storage media of claim 16, wherein the base image includes a custom image loader, wherein the custom image loader obtains the customer image and causes updating of the internal memory to include the linked customer image and base image.

20. The computer storage media of claim 16, wherein the instructions are associated with a custom image loader included in the base image.

* * * * *